Dec. 19, 1961     F. O. E. SCHULTZ     3,013,535
BRAKE BOOSTER MECHANISM

Filed Oct. 1, 1958     2 Sheets-Sheet 1

INVENTOR.
FORREST O. E. SCHULTZ
BY
*Irwin L. Groh*
ATTORNEY.

Dec. 19, 1961  F. O. E. SCHULTZ  3,013,535
BRAKE BOOSTER MECHANISM
Filed Oct. 1, 1958  2 Sheets-Sheet 2

INVENTOR.
FORREST O. E. SCHULTZ
BY
Irvin L. Groh
ATTORNEY.

United States Patent Office 3,013,535
Patented Dec. 19, 1961

3,013,535
BRAKE BOOSTER MECHANISM
Forrest O. E. Schultz, Owosso, Mich., assignor to Midland-Ross Corporation, Cleveland, Ohio, a corporation of Ohio
Filed Oct. 1, 1958, Ser. No. 764,663
7 Claims. (Cl. 121—41)

This invention relates to booster brake mechanisms incorporating a fluid motor for actuating the master cylinder of a hydraulic brake system.

Fluid motor or boosters used for power actuation of hydraulic systems on motor vehicles ordinarily utilize the differential pressure between fluid at atmospheric pressure and at sub-atmospheric pressure to cause movement of a power piston in the booster. The atmospheric pressure is supplied from the exterior air surrounding the booster and the sub-atmospheric pressure is produced by operatiton of the engine, that is, the sub-atmospheric or vacuum pressure formed in the manifold is delivered to the booster.

Problems are created when the engine stalls or will not operate for some other reason since a source of vacuum is not made available and a differential pressure cannot be produced for power actuation of the brakes. Most booster brake mechanisms provide for direct manual actuation of the hydraulic brakes upon failure of the booster. In such cases a manual force is required on the foot pedal which is considerably in excess of the force required when power is available for actuation of the brakes. The increase in pedal force that is required for manual or power-off application of the brakes is further aggravated since the force must be sufficient not only to manually actuate the hydraulic brakes but also to move the power piston of the booster. The movement of the piston is ordinarily resisted by atmospheric air trapped in the booster housing and movement of the piston requires the atmospheric air to be compressed or dissipated. This is a serious problem since the operator is not always aware that the engine has failed and when it becomes necessary to apply the brakes, he must produce a pedal force in excess of that required to manually apply the hydraulic brakes.

With this in mind, it is an object of the invention to provide a booster brake mechanism in which failure of the vacuum source makes it possible to apply the hydraulic brakes manually with a force not exceeding that normally required to apply hydraulic brakes which are not power actuated.

It is a further object of the invention to provide a booster brake mechanism in which the power piston of the booster may be moved manually upon failure of the vacuum source with a minimum force so that the hydraulic brakes may be applied.

It is still another object of the invention to provide a booster in which the power piston has its opposite sides in communication with each other upon failure of the vacuum source so that movement of the power piston is not restricted by atmospheric air trapped in the booster.

It is a more specific object of the invention to provide a booster brake mechanism in which the valve mechanism for controlling fluid pressures in the booster is so arranged that chambers in opposite sides of the piston are in continuous communication with each other and the atmosphere upon failure of the vacuum source so that the piston is movable manually without undue resistance.

A still further object of the invention is to provide a booster mechanism incorporating valve means so arranged that differential pressure acting thereon is utilized for the operation of the valve when a source of vacuum exists and which moves with the manually moved members on failure of the vacuum source to maintain the booster in continuous communication with the atmosphere.

The foregoing and other objects and advantages are attained by the present invention, various novel features of which will be apparent from the following description and from the accompanying drawings disclosing a preferred embodiment of the invention.

Referring to the drawings.

Figure 1:
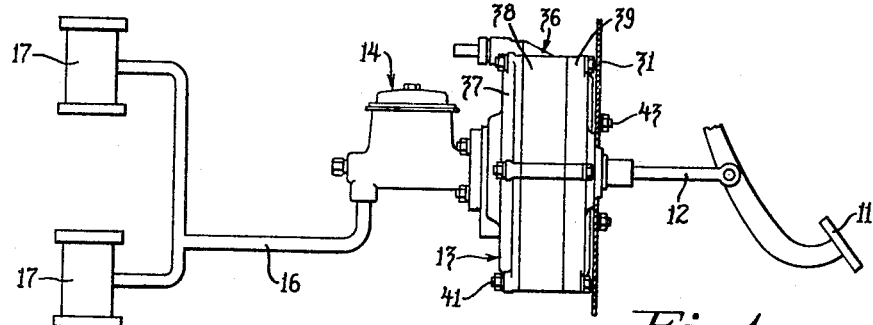
FIG. 1 is a diagrammatic representation of a hydraulic brake system incorporating a booster mechanism embodying the present invention.

As shown in FIG. 1, a power brake system incorporating the present invention includes the usual swinging foot pedal 11 which is used to transmit movement to a rod 12 for actuating a fluid motor or booster 13 in a manner to be more specifically described later. When actuated, the booster applies force to a piston in the hydraulic master cylinder 14 which in turn forces fluid through lines 16 to conventional type brake actuators 17 located at the wheels of a vehicle. In the usual hydraulic brake system, as illustrated in FIG. 5, the rod 12 transmits movement directly from the pedal 11 to the master cylinder 14 without the aid of a booster.

Figure 2:
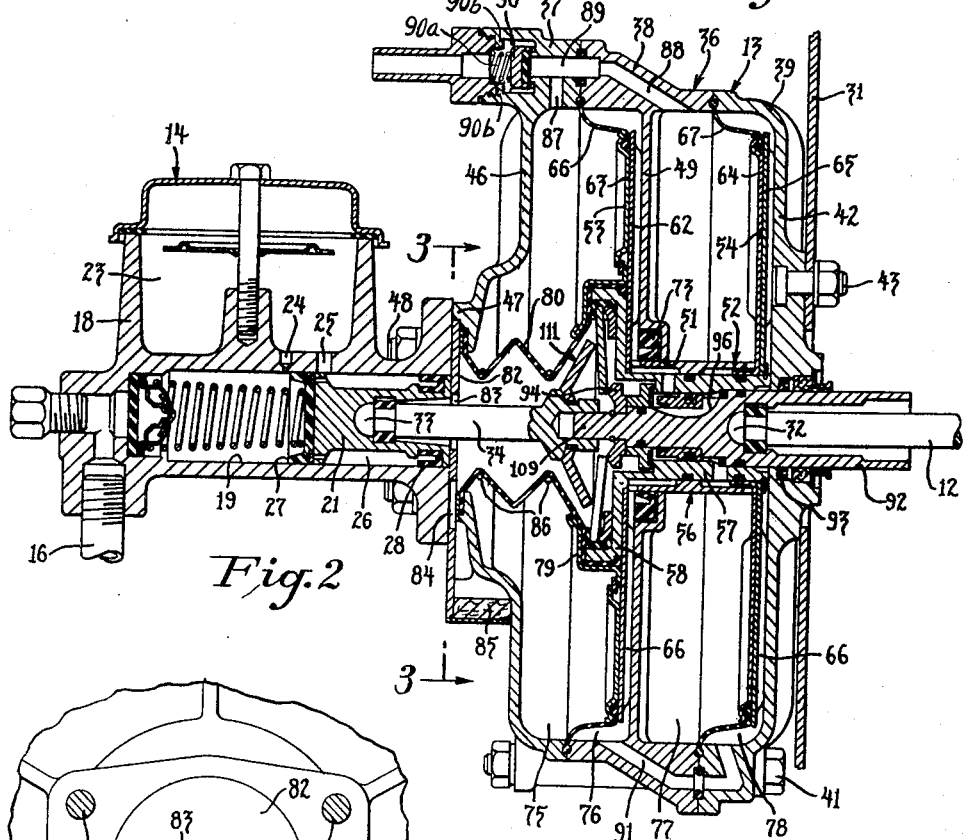
FIG. 2 is an enlarged, cross-sectional view of a booster and an attached master cylinder, such as shown in FIG. 1.

Referring to FIG. 2, the master cylinder 14 is illustrative of the type in common use on American automobiles to actuate hydraulic brake systems and a detailed description of construction and operation is not necessary for an understanding of the invention. The master cylinder includes a housing 18 having a bore 19 slidably receiving a piston 21 which is used to force hydraulic fluid under pressure through lines 16 to the brake actuators 17. The housing 18 incorporates the usual fluid reservoir 23 formed above the bore 19. The reservoir is used to maintain the entire hydraulic brake system full of fluid by way of the restricted passage 24. The reservoir also communicates through an opening 25 with an annular chamber 26 formed about the master cylinder piston 21 between a high pressure seal 27 and a low pressure seal 28. The chamber 26, like the reservoir 23, normally contains liquid in the form of hydraulic fluid at atmospheric pressure.

Figure 5:
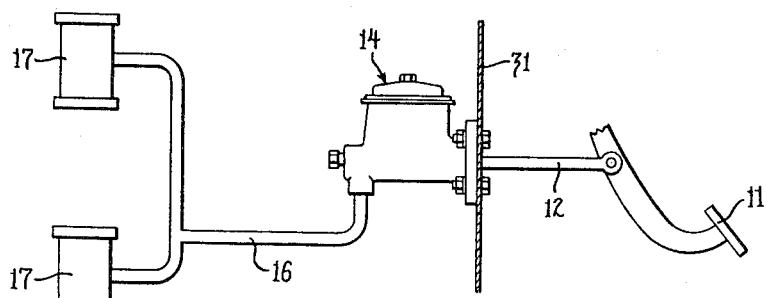

In conventional hydraulic systems, as shown in FIG. 5, the master cylinder 14 is usually mounted on the partition wall or firewall 31 which divides the passenger compartment from the engine compartment in an automobile. In this position, the master cylinder is properly located to receive the forward end portion 32 of rod 12 (FIG. 2). When the master cylinder 14 is used in a power brake system, as shown in FIG. 1, it is mounted on the booster 13 to receive the forward end portion 33 of the booster rod 34.

The booster 13 comprises a housing 36 made up of separable parts 37, 38 and 39 which are held together by means of bolts 41. Housing part 39 forms a rearward wall 42 which is secured to the firewall 31 in the position normally occupied by the master cylinder 14 through means of bolts 43. The housing part 37 forms a forward wall 46 which presents a mounting portion 47 for receiving the rearward or open end of the master cylinder 14. The master cylinder is rigidly secured in position on the booster 13 through bolt means 48.

Figure 4:
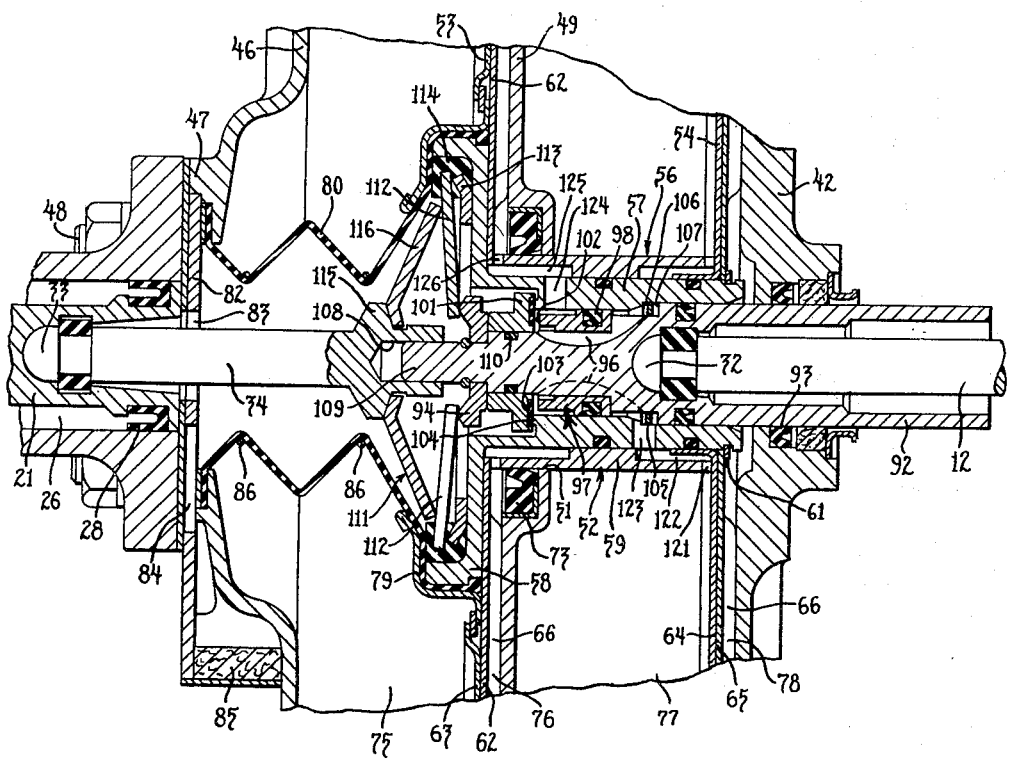
FIG. 4 is a cross-sectional view of a portion of the mechanism shown in FIG. 2 but at an enlarged scale; and, FIG. 5 is a view similar to FIG. 1 showing the arrangement of parts when a booster is not used.

The housing 36 is divided by a stationary wall 49 formed integrally with the housing portion 38 and is provided with an opening 51 which slidably supports a double piston or wall unit designated generally by the reference character 52. The piston assembly comprises a pair of movable walls 53 and 54 rigidly connected to the opposite ends of a valve housing 56. The movable walls 53 and 54 and the valve housing 56 move as a unit but for manufacturing purposes, the assembly is made up of a number of parts. More specifically, and as best shown in FIG. 4, the valve housing 56 includes a generally tubular member 57 having a flanged portion 58 at its forward end. A second tubular member 59 fits over the tubular member 57 and opposite ends engage walls 53 and 54 to hold them in spaced relation on the valve housing between the flange 58 and a snap ring 61. The tubular members 57 and 59 make it possible to provide a number of fluid conveying passages to which reference will be made later.

The movable wall 53 is made up of a plate 62 rigidly connected to a ring 63 and the movable wall 54 is formed by plate 64 rigidly connected to another plate 65. A ring shaped diaphragm 66 has a bead at its inner circumference clamped between ring 63 and plate 62 and a similar diaphragm 67 has its inner bead clamped between plates 64 and 65. Beads at the outer circumferences of the diaphragms 66 and 67 are clamped between the housing portions 37, 38 and 39. The plates 62 and 65 are provided with a plurality of ribs 66 which act to reinforce the walls 53 and 54 and also engage the walls 42 and 49 of the housing to limit rearward movement of the piston unit 52.

The stationary wall 49 divides the interior of the housing 36 into a forward compartment and a rearward compartment. To maintain the compartments isolated from each other, a seal 73 is mounted adjacent the opening 51 in the wall 49 so that it slides relative to the outer surface of the valve chamber 56. Each of the housing compartments are divided into a pair of pressure chambers by the movable walls 53 and 54 and the diaphragms 66 and 67. The forward housing chamber forms a constant pressure chamber 75 at the forward side of the wall 53 and a variable pressure chamber 76 at the rearward side of the wall. The rearward housing compartment is divided into a constant pressure chamber 77 forward of wall 54 and a variable pressure chamber 78 rearward of the wall.

Figure 3:
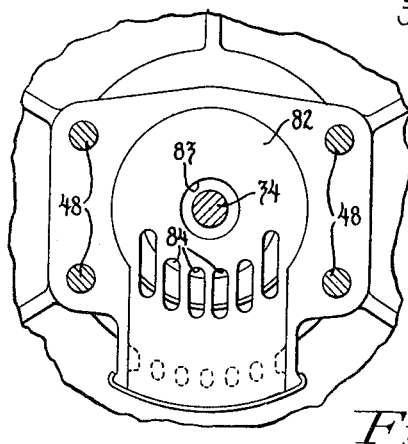
FIG. 3 is a cross-sectional view taken on line 3—3 in FIG. 2.

As best seen in FIG. 4, a tubular member or bellows 80 which is made of resilient material is disposed in the forward part of the housing with its rearward end clamped against the flange 58 by means of a dished ring 79 held in position by plate 62 and ring 63. The forward end of the bellows 80 is clamped between the mounting portion 47 and a plate 82. The plate has an opening 83 which communicates with the interior of the bellows and, consequently, with the valve chamber member 56. Referring to FIG. 3, the plate 82 is provided with a plurality of slots 84 which place the opening 83 and the interior of the bellows in communication with the atmosphere through a filter type breather 85. The bellows is resilient and permits movement of the piston means without interference. During such movement, the interior of the bellows, which remains in constant communication with the atmosphere, acts as a constant, high pressure chamber. Since the chamber 75 exterior of the bellows is at vacuum pressure, a plurality of rings 86 surround the bellows 80 to prevent the latter from expanding due to the pressure differential.

The constant pressure chambers 75 and 77 communicate with each other through passages 87 and 88 connected to a passage 89, all of which are formed in the outer circumference of the housing 36. The passage 89 communicates with a vacuum source such as the intake manifold (not shown) on a vehicle engine.

A check valve 90 is disposed in the passage 89 and is operative to open whenever the pressure in the chambers 75 and 77 is higher than the pressure from the vacuum source. Under this condition the check valve 90 moves against the bias of a spring 90a into engagement with prongs 90b which permit flow around the check valve 90. If the vacuum source should fail due to a leak or when the vehicle engine stops, the check valve will close under the action of spring 90a and atmospheric air at the left side will hold the valve element 90 seated as shown in FIG. 2 to trap vacuum pressure in the chambers 75 and 77. The trapped vacuum pressure is available for at least one actuation of the booster after the vacuum source has failed.

The variable pressure chambers 76 and 78 are maintained in constant communication with each other by means of passage 91 formed in the parts 38 and 39 at the outer circumference of the housing 36.

A manually operable member or valve guide 92 is supported in the rear wall of the housing 36 for sliding movement within the valve chamber 56. A seal 93 prevents leakage between the housing and the guide 92. The valve guide is made up of a number of parts but for all practical purposes it may be considered as a unit. The forward portion of the valve guide is reduced in diameter and is fitted with a stop element or collar 94 and an intermediate portion of the valve guide has a plurality of axially extending slots 96 over which a collar 97 is fitted. The collar 97 is provided with a groove for receiving a seal 98 which acts against the inside diameter of the valve housing 56. The slots 96 afford a passage means to permit fluid pressure to communicate with opposite sides of the seal 98. The rearward portion of the valve guide 92 is hollow to receive the forward end 32 of rod 12.

A valve element 101 is mounted for sliding movement on the valve guide 92 between the stop or collar 94 and an annular valve seat 102 formed on the collar 97. The valve 101 is provided with a resilient ring 103 which is relatively wide so that it can engage both the valve seat 102 and an annular valve seat 104 formed on the valve housing 56 concentric with the valve seat 102. When the valve element 101 is engaged with the valve seat 104, which may be considered as a high pressure valve, the variable pressure chambers 76 and 78 are isolated from the atmospheric pressure chambers formed by the bellows 80. When the valve seat 102, forming a low pressure valve, is closed by the valve element 101, the vacuum pressure chambers 75 and 77 are isolated from the variable pressure chambers 76 and 77. A seal 110 is seated in a slot formed in the valve guide 92 to engage the valve element 101 and prevent fluid leakage when either the high or low pressure valves are closed.

A spring 105 in the form of a wave washer is disposed between shoulders 106 and 107 on the valve guide 92 and the valve housing 56, respectively. The spring serves to urge the valve guide rearwardly relative to the wall assembly 52 and in so doing, the collar 94 rigidly connected to the valve guide 92 engages the valve element 101 and urges it into engagement with the valve seat 104.

The booster rod 34, which has an end portion 33 engaging the master cylinder piston 21, has a hollow end portion 108 which slidably receives the reduced end portion 109 of the valve guide 92. Movement of the valve guide 92 and the piston or wall assembly 52 is transmitted to the rod 34 through a connection afforded by a lever assembly generally designated by the reference character 111. The lever assembly includes a plurality of radially disposed levers 112 having their outer radial edges held to a ring 113 by a resilient rubber ring 114. A dished shaped ring 116 is adapted to be seated on the rod 34 with its outer diameter engaging intermediate portions of the radial levers 112 and with its inner diameter engaging a projection 115 on the rod 34. The lever assembly 111 is effective to connect the valve guide 92, the rod 34 and wall or piston unit 52 so that movement of any one of the parts results in positive movement of one or both of the other parts. The levers 112 are spaced apart circumferentially to permit the free flow of fluid from the interior of the bellows 80 to the left side of the valve element 101.

Operation

In the relative positions of the parts shown in FIGS. 2 and 4, the booster is in its released position, that is, the brakes of the vehicle are released. The chambers 75 to 78 are at the same sub-atmospheric pressure and are isolated from the atmospheric pressure available in the bellows 80. Under these conditions, the power unit 52 is at its extreme right position in the housing 36. The spring 105 urges the valve guide 92 to the right relative to the piston unit 52 so that the collar 94 engages the valve element 101 and maintains it in engagement with the valve seat 104. Since the valve seat 102 is formed integrally with the valve guide 92, it is positioned out of engagement with the valve 101. This permits the constant pressure or vacuum chamber 77 to communicate with the variable pressure chamber 76 through radial passages 121, annular chamber 122, radial passages 123, slots 96, between valve element 101 and valve seat 102, through a radial passage 124, annular chamber 125 and radial passages 126. Since the variable pressure chambers 76 and 78 are in constant communication with each other and since the constant pressure chambers 75 and 77 communicate with each other, the communication through the valve passages maintains the chambers 75 through 78 at vacuum pressure. Consequently, the pressures at opposite sides of the movable walls 53 and 54 are equal and the power unit 52 is held stationary. In the industry it is common to refer to such boosters as being vacuum suspended since the pressures at opposite sides of the piston units are at equal vacuum pressures when the booster is in a released or unapplied condition.

Power actuation of the brakes is accomplished by applying foot pressure to the pedal 11 to actuate the valve 101 so that a pressure differential is created on the walls 53 and 54. The pressure differential results in movement of the piston assembly 52 to the left. The manual force applied to the pedal 11 and the force due to movement of the piston assembly 52 are transmitted through the rod 34 to the hydraulic piston 21 to actuate the brakes.

Initial foot pressure at the pedal 11 is transmitted to the rod 12 and the valve guide 92 moves to the left. During such movement the valve element 101 is maintained in engagement with the annular valve seat 104 by differential pressure acting on the valve element 101. More specifically, the left side of the valve element is exposed to atmospheric pressure in the bellows 80 and the right side of the valve element is exposed to vacuum pressure. This results in a presure differential which forces the valve element 101 to the right against the seat 104 and maintains it in that position until the annular valve seat 102 is engaged. At the same time that valve seat 102 approaches valve element 101, the collar 94 moves to the left and pushes against the inner ends of the radially extending levers 112. The outers ends of the levers 112 fulcrum about the annular edge of the stationary ring 113 so that intermediate portions of the levers 112 push against the dished ring 116, which in turn transmits movement to the rod 34. Movement of the rod 34 is transmitted to the piston 21 of the master cylinder. Such initial movement of the foot pedal 11 and the various parts of the booster is effective to transmit manual force from the rod 12 to the master cylinder 14. The initial application of manual force is effective to increase the pressure in the hydraulic circuits and the actuators 17 are initially energized to take up any slack that may exist in the brake mechanism at the wheels so that additional movement will result in application of the brakes.

As the valve seat 102 engages the resilient ring 103 formed on the valve 101, the valve is in its lapped position, that is, both of the valve seats 102 and 104 are closed so that the constant pressure chambers 75 and 77, the variable pressure chambers 76, 78, and the interior of the bellows 80 are isolated from each other. Under these conditions, the booster is ready for actuation and any further movement of foot pedal 11 is effective to bring about a power actuation of the brakes.

Movement of the valve guide 92 to the left from the lapped position of the valve is effective to move the valve element 101 from the annular valve seat 104. As soon as separation of the valve seal 103 and the valve seat 104 occurs, atmospheric air within the bellows 80 passes between the valve 101 and the valve seat 104 and enters the passage 124 to the annular chamber 125 and through the radial passage 126 into the variable pressure chamber 76. From the variable pressure chamber 76, atmospheric air passes by way of the passage 91 to the other variable pressure chamber 78. This creates a pressure differential, that is, vacuum exists at the left of the movable walls 53 and 54 and atmospheric air pressure exists to the right of the movable walls. The effect of the pressure differential is to move the walls 53 and 54 to the left as viewed in FIG. 2. The movement of the walls is transmitted to the rod 34 through ring 113 acting on the radial levers 112 which now fulcrum about their inner ends on the collar 94 which may be considered as held against movement to the right by manual force on the pedal 11. Intermediate portions of the levers push against the outer circumference of ring 116 and move the rod 34. Such operation causes power application of the brakes, that is, the power pushes the rod 34 and the piston 21 of the hydraulic cylinder to force fluid to the brake motors 17. A portion of the power application is transmitted through the radial levers 112 rearwardly to the rod 12 and, consequently, to the pedal 11 so that the operator applying the brakes may sense the degree of brake application.

When the brakes have been applied to the necessary degree, movement of rod 12 is stopped and the differential pressure causes the walls 53 and 54 to assume a position in which the valve 101 engages both of the annular valve seats 102 and 104 so that the valve again is in a lapped position. Under these conditions, the constant pressure chambers 75 and 77 are at vacuum pressure and are isolated from the variable pressure chambers 76 and 78 which are at some greater pressure approaching atmospheric pressure. As long as foot pressure is maintained on the pedal 11, the brakes will remain in their applied position.

Under some conditions, for example when the pedal 11 is moved very rapidly, it is possible that the double piston assembly 52 will continue to move briefly after movement of the valve guide 92 stops. This will cause the valve 101 to be moved to the left by the valve seat 104 and away from the valve seat 102. This permits pressure in the variable pressure chambers to be relieved slightly so that the movable walls 53 and 54 will return to the right to permit the valve 101 to engage the valve seat 102, thereby isolating chambers 75 and 77 from chambers 76 and 78. Under these conditions, the valve mechanism will be in a lapped position and the brakes will remain constantly applied.

When the brakes are to be released from the applied position previously described, some of the manual effort applied to the pedal 11 is released. The hydraulic pressure acts on the piston 21 and urges it to the right together with the rod 34. With differential pressure holding the piston unit 52, the lever assembly 111 moves the valve guide 92 and the rod 12 to the right. Since the valve mechanism is in its lapped position just prior to release, initial movement of the rod 12 and the valve guide 92 to the right will open the vacuum valve 102, that is, the annular valve seat 102 will move from engagement with the valve 101. This will lower the pressure in chambers 76 and 78 and the double piston assembly 52 will be urged to the right due to hydraulic pressure acting to the right on the piston 21. If pedal movement is interrupted at some point before reaching the fully released position of the brakes, the double piston unit 52 will continue to move to the right relative to the stationary valve guide 92 so that the valve 101 again engages the annular valve seat 102 to put the valve in a lapped position. The pressure that remains in the variable pressure chambers 76 and 78 will be effective to maintain the brakes in a partially applied condition until the pedal 11 is fully released. Upon full release of the pedal 11, the rod 12 and valve guide 92 will again move to the right due to hydraulic pressure on the piston 21 and permit the vacuum valve 102 to open so that the variable pressure chambers communicate with the vacuum source until the pressure in all of the chambers 75 through 78 are balanced and the booster reaches its vacuum suspended or released position. In the event the pedal 11 is released slowly, the wall unit 52 will move to its extreme right position at which time the hydraulic pressure will be extremely low and may be insufficient to return the valve guide 92 to the right so that the seat 102 disengages from the valve element 101. The wave form spring 105 acting between the piston unit 52 and the valve guide 92 offers sufficient force to accomplish the desired final movement so that all of the parts return to their initial, fully released position as illustrated in FIGS. 2 and 4.

Thus far operation has been discussed from the standpoint of the usual power-on application, that is, with the vehicle engine operating so that a source of vacuum exists. In the present arrangement, safeguards are afforded to insure braking upon power-off application of the brakes, that is, when the engine stalls and the vacuum source fails. As described previously, a check valve 90 is provided in the line 89. This eliminates the need for a vacuum reservoir since a vacuum pressure will be maintained in the booster housing when the vacuum source is lost. Such an arrangement affords one or more power brake applications. Thereafter, brake applications are accomplished without the benefit of a pressure differential. For example, initial pedal pressure will be transmitted to the valve guide 92 and to the inner ends of the radial levers 112. The piston unit will remain stationary and in engagement with the walls of the housing so the levers 112 fulcrum about their radially outer ends to manually move the rod 34 for actuating the hydraulic cylinder. After the relatively weak spring 105 is compressed, the shoulder 107 on valve guide 92 is effective against the shoulder 106 to manually move the piston unit 52 to the left. Consequently, the manual force applied to the foot pedal 11 will be effective to move all of the parts including the wall unit 52 to the left to actuate the master cylinder and apply the brakes.

Manual operation has been accomplished by prior art boosters but in most cases movement of the piston unit is resisted by the atmospheric pressure which is established in the constant pressure or vacuum chamber (chambers 75 and 77 in the subject booster) after engine failure. This offers a substantial resistance to manual application of the brakes.

In the present booster, the check valve 90 eliminates the need for a separate vacuum reservoir but it also interferes with manual movement of the piston unit 52 after vacuum pressure in chambers 75 and 77 increases to atmospheric pressure. Ordinarily, the valve would have to be unseated to permit escape of the pressure generated by manual movement of the piston unit 52 to the left. Automatic unseating of the valve in response to pressure increase would require a very large pedal force and would be undesirable from the standpoint of safe operation, particularly if a large pedal force were required when the driver expected a power application of the brakes.

These problems are overcome in the preferred embodiment of the invention by the novel valve arrangement and operation which permits free interchange of atmospheric air between all of the chambers 75—78 and the bellows 80 so that the piston unit 52 may be moved freely during manual operation and release of the brakes upon failure of the vacuum source.

Referring again to FIG. 4, during normal power-on operation of the brakes, the valve 101 is maintained in engagement with the seat 104 by pressure differential, that is, atmospheric pressure in bellows 80 acts to the left of valve element 101 and sub-atmospheric or vacuum pressure in chambers 75—78 acts to the right. This pressure differential is sufficient to maintain the valve 101 seated on annular seat 104 during movement of valve guide 92 to the left to close the valve seat 102. However, when the vacuum source fails due to engine failure or a leak in the vacuum supply system, all of the chambers 75—78 will eventually reach atmospheric pressure as the brakes are applied. Application of the brakes results in atmospheric air in the variable pressure chambers 76 and 78. When the brakes are released in the absence of a vacuum supply, atmospheric air from chambers 76 and 78 mixes with the subatmospheric air in chambers 75 and 77. Subsequent application and release of the brakes further increases the pressures in the chambers in this manner until all are equal at atmospheric pressure. Consequently, when the vacuum source fails, atmospheric pressure in chambers 75—78 equals the atmospheric pressure in bellows 80 and pressure at opposite sides of the valve 101 becomes equal. Thereafter, the valve 101, which is not opposed by force due to pressure, will be free to move as a unit with the valve guide 92. Such unitary movement is facilitated by friction means in the form of the seal 110 which acts between the valve 101 and valve guide 92. During power-on operation, the friction between the parts is overcome by the pressure differential acting on the valve element 101. When the pressure differential fails, movement of the valve guide or plunger 92 to the left carries the valve element 101 away from the seat 104 and maintains it in its normally spaced relation to the seat 102 so that all of the chambers 75, 76, 77 and 78 and the bellows 80 remain in communication. Consequently, when the wall unit 52 is moved to the left, air is forced from the chambers 75, 77 around the valve 101, seats 102 and 104, to the chambers 76 and 78 and, if necessary, through the bellows 80 and breather 85. In like manner, upon release of the brakes, hydraulic pressure is effective to move the wall unit 52 and manually operable member 92 to the right in which case fluid at atmospheric pressure may flow freely from chambers 76 and 78 to either chambers 75 and 77 or to the bellows 80. The free interchange of fluid between the various chambers permits the piston or wall unit to be moved manually without resistance from air which may be trapped in the booster housing.

The friction afforded by the seal 110 is very small and under unusual conditions it is conceivable that the valve guide 92 may move relative to the valve element 101 leaving it seated on the valve seat 104 even though a pressure differential does not exist across the valve 101. Under such circumstances the valve seat 102 will close on the valve element 101 to move it from the seat 104. Subsequent movement of the piston unit 52 will increase the pressure in chambers 75 and 77 above atmospheric pressure. As soon as the pressure increases slightly, a pressure differential will be created across the valve 101 which will urge it away from the seat 102 relative to the valve guide 92 in opposition to the slight resistance of the seal 110. Such operation insures that the valve element 101 will open both valve seats 102 and 104 under all conditions when the vacuum source fails to insure free fluid communication between the chambers and the bellows.

It should be understood that it is not intended to limit the invention to the above described forms and details, and that the invention includes such other forms and modifications as are embraced by the scope of the appended claims.

It is claimed and desired to secure by Letters Patent:

1. A brake booster mechanism comprising a fluid operated motor having a housing, a movable wall in said housing dividing the latter into a low pressure chamber in communication with a source of vacuum and a variable pressure chamber at opposite sides of said wall, a hydraulic master cylinder and piston means operatively connected to said wall for actuation thereby, a source of atmospheric pressure, first valve means controlling communication between said source of atmospheric pressure and said variable pressure chamber and having a closed position for isolating and an open position for communicating said source of atmospheric pressure and said variable pressure chamber, a second valve means controlling fluid flow between said chambers and having a closed position isolating and an open position communicating said chambers, said first valve means normally being held in said closed position in the presence of differential pressure acting on said valve element, manually operable means supported on said housing for actuating said valve means, said manually operable member normally being movable to open one of said valve means while closing the other of said valve means and being movable upon failure of said vacuum source eliminating said differential pressure to maintain both of said valve means open simultaneously for free communication between said chambers and said source of atmospheric pressure, said manually operable member being engageable with said wall for manually moving the latter when both of said valve means are in said open positions.

2. A brake booster mechanism comprising a fluid operated motor having a housing, a movable wall disposed in said housing and dividing the latter into a vacuum chamber and a variable pressure chamber at opposite sides of said wall, a hydraulic master cylinder and piston means adapted to be operatively connected to said wall for actuation thereby, valve means including a manually operable member, a valve element supported on said manually operable member for movement relative thereto between predetermined positions, a valve seat formed on said wall between said variable pressure chamber and a source of atmosphere, said valve element being movable into and out of engagement with said seat and normally being held engaged therewith solely by differential pressure in said variable pressure chamber and source of atmosphere, said manually operable member being movable first relative to said valve element to engage the latter and isolate said vacuum and variable pressure chambers and subsequently as a unit with said valve element for moving the latter from said seat to admit atmospheric pressure to said variable pressure chamber for actuation of said wall, said valve element being movable as a unit with said manually operable member throughout the entire range of movement of the latter in the absence of differential pressure upon failure of said source of vacuum to maintain said chambers in communication with each other.

3. In a booster for power actuation of a master cylinder of a hydraulic brake system, the combination of a housing having a movable pressure actuated wall dividing said housing into a vacuum chamber and a variable pressure chamber, a check valve disposed between said source of vacuum and said vacuum chamber to isolate the latter from the atmosphere when said source of vacuum fails, a valve housing formed by said wall and presenting an annular valve seat forming an atmospheric chamber at one side and having the opposite side communicating with said variable pressure chamber, a manually operable member movable within said housing and forming a second annular valve seat concentric with said first valve seat and having opposite sides communicating with said variable pressure and vacuum pressure chambers, a valve element supported on said manually operable member and being engageable with said valve seats, said valve element normally being maintained in engagement with said first valve seat in response to differential pressure existing in said variable pressure and atmospheric pressure chambers and acting on opposite sides of said valve element, said manually operable member being movable between a first position in which said second valve seat and valve element are spaced from each other to place said vacuum and variable pressure chambers in communication with each other, and a second position in which said second valve seat engages said valve element to move the latter with said manually operable member against the action of differential pressure and out of engagement with said first valve seat to admit fluid pressure from said atmospheric chamber to said variable pressure chamber for actuating said movable wall, said valve element being movable as a unit with said manually operable member to a position in spaced relation to both of said valve seats upon failure of said vacuum source to place said chambers in communication with each other and with said source of atmospheric pressure to permit free flow of fluid to and from opposite sides of said wall for unrestricted manual movement of the latter.

4. In a booster for power actuation of a hydraulic brake system, the combination of a housing having a movable wall therein adapted for connection to the hydraulic brake system, said wall dividing the housing into a vacuum chamber forwardly of said wall communicating with a source of vacuum and a variable pressure chamber rearwardly of said wall, valve means including a first valve seat formed by said wall, a manually operable member adapted to actuate said brake system and forming a second valve seat, a valve element movable relative to said manually operable member and being engageable with said seats, means for resisting movement of said valve element relative to said manually operable member, a source of atmospheric pressure communicating with said valve means, said valve element having opposite sides communicating with said variable pressure chamber and with said source of atmospheric pressure when said valve element is engaged with said first seat to establish differential pressures for overcoming said means and maintaining said valve element in engagement with said seat, said manually operable member having an initial position in which said variable pressure and vacuum chambers are in communication with each other, said manually operable member being movable from said initial position relative to said valve element to urge said second valve seat into engagement with said valve element to isolate said chambers from each other and move said valve element from said first valve seat to admit fluid from said source of atmospheric pressure to said variable pressure chamber for actuating said wall, said means being operative in the absence of differential pressure to maintain said valve element stationary relative to said manually operable member during movement of the latter from said initial position to maintain said valve element disengaged from said second valve seat and to disengage said valve element from said first valve seat for maintaining said chambers in communication with each other and with said atmospheric source to permit unrestricted manual movement of said piston.

5. A brake booster mechanism comprising a motor having a housing, a movable wall disposed in said housing dividing the latter into a vacuum chamber at one side of said wall communicating with a source of vacuum and a variable pressure chamber at the opposite side of said wall, a hydraulic master cylinder and piston means adapted to be operatively connected to said wall for actuation thereby, valve means including a manually operable member, a valve element supported on said manually operable member for movement relative thereto and relative to said wall, a pair of valve seats formed by said wall and said manually operable member, respectively, for engagement with said valve element, said manually operable member being movable from an initial position in which one of said valve seats is engaged with said valve element and the other seat is disengaged from said valve ment to maintain said chambers isolated from the atmosphere and in communication with each other, said manually operable member being movable toward a final position to move the other of said valve seats into engagement with said valve element to isolate said chambers from each other and move said valve element from said first mentioned seat to place the variable pressure chamber in communication with the atmosphere to actuate said wall, a stop element formed integrally with said manually operable member and being spaced from said wall when said manually operable member is in said initial position and being engageable with said wall upon failure of said source of vacuum to engage and manually move said wall together with said manually operable member, said valve element being movable as a unit with said manually operable member upon failure of said source of vacuum to move and maintain said valve element out of engagement with said first and second seats and establish communication between said chambers and the atmosphere for free fluid flow therebetween during manual movement of said wall.

6. A brake booster mechanism comprising a fluid pressure operated motor including a housing having a movable wall therein, a hydraulic fluid displacing mechanism mounted on said housing coaxially with said wall, a manually operable member movable in said housing, means connecting said manually operable member, wall and mechanism for dependent movement relative to each other, said wall dividing said housing into a constant pressure chamber communicating with a source of low pressure and a variable pressure chamber at opposite sides of said wall, a source of relatively high pressure, valve means controlling communication between said chambers and said source of high pressure, a manually operable member, a valve element supported for movement on said manually operable member, a first valve seat formed by said wall and being engageable with said valve element to isolate said source of high pressure from said variable pressure chamber, a second valve seat formed by said manually operable member and being engageable with said valve element to isolate said low pressure chamber from said variable pressure chamber, said valve element normally being disposed in an inactivated position engaged with said first valve seat and spaced from said second valve seat to maintain equal pressures at opposite sides of said wall, friction means disposed between said manually operable member and said valve element for resisting movement of the latter relative to said manually operable member, said valve element having opposite sides exposed to said source of high pressure and said variable pressure chamber when the latter is in said inactivated position to establish differential pressure on said valve element overcoming said friction means to permit relative movement of said valve element and manually operable member, said manually operable member being movable in one direction relative to said valve element to urge said second valve seat into engagement therewith, said second valve seat being operable to force said valve element out of engagement with said first valve seat for actuating said wall, said friction means being operative to move said valve element in spaced relation to said second valve seat and relative to said first valve seat upon failure of said low pressure source for establishing continuous communication between said chambers for unrestricted manual movement of said wall.

7. A brake booster mechanism comprising a fluid pressure operated motor including a housing having a movable wall therein, a hydraulic fluid displacing mechanism supported on said housing for movement by said wall, a manually operable member movable in said housing, said wall dividing said housing into a low pressure chamber communicatnig with a source of vacuum and a variable pressure chamber at opposite sides of said wall, valve means connected to said manually operable member for actuation thereby to control fluid pressures in said chambers, means for supplying atmospheric pressure to said valve means, said valve means including a high pressure valve seat formed by said wall and having opposite sides communicating with said variable pressure chamber and atmospheric pressure, a low pressure valve seat formed on said manually operable member and having opposite sides communicating with said variable pressure and vacuum pressure chambers, a valve element supported on said manually operable member for movement relative thereto, said manually operable member being movable in one range between a first position in which said low pressure valve seat is spaced from said valve element to permit communication between said chambers and a second position in which said low pressure valve seat is engaged with said valve element to isolate said chambers from each other, said manually operable member being movable in another range between said second position and a third position in which said valve element is spaced from said high pressure valve seat to permit communication of said atmospheric source and said variable pressure chamber for creating differential pressure actuating said wall, said valve element normally being held against said high pressure seat during movement of said manually operable member in said one range by differential pressure in said atmospheric source and variable pressure chamber acting on opposite sides of said valve element, said valve element being movable as a unit with said manually operable member in both ranges of movement of the latter upon failure of differential pressure to move and maintain said valve element out of engagement with both of said seats for continuous communication of said chambers and said source of atmospheric pressure, said wall being engaged by said manually operable member for movement thereby when said valve is disengaged from both of said valve seats.

References Cited in the file of this patent

UNITED STATES PATENTS

| | | |
|---|---|---|
| 2,745,383 | Hupp | May 15, 1956 |
| 2,842,101 | Price | July 8, 1958 |
| 2,924,072 | Burwell | Feb. 9, 1960 |